(12) United States Patent
Peltola

(10) Patent No.: US 7,206,577 B2
(45) Date of Patent: Apr. 17, 2007

(54) METHOD AND APPARATUS FOR RECEIVING SITE SELECTION DIVERSITY TRANSMIT (SSDT) SIGNAL IN A WIDEBAND CODE DIVISION MULTIPLE ACCESS (WCDMA) SYSTEM

(75) Inventor: Ari Juhani Peltola, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/805,994

(22) Filed: Mar. 22, 2004

(65) Prior Publication Data

US 2004/0235434 A1 Nov. 25, 2004

Related U.S. Application Data

(60) Provisional application No. 60/468,471, filed on May 6, 2003.

(51) Int. Cl.
*H04Q 7/20* (2006.01)

(52) U.S. Cl. .............. 455/435.2; 455/435.1; 455/452.1; 455/434; 370/328; 370/333

(58) Field of Classification Search ............ 455/101, 455/436, 437, 442, 422, 407, 422.1, 444, 455/425, 435.3, 447, 435.1–435.2, 439, 452.1, 455/452.2, 454, 456.2, 456.5, 515, 525, 62, 455/550.1, 575.1, 309, 438, 408, 424, 434, 455/561, 452.6; 370/342, 209, 335, 441, 370/328–333, 252; 714/748, 749, 750, 759; 375/130, 134, 145, 220
See application file for complete search history.

(56) References Cited

U.S. PATENT DOCUMENTS

| | | | | |
|---|---|---|---|---|
| 5,175,866 | A * | 12/1992 | Childress et al. | 455/8 |
| 5,910,947 | A * | 6/1999 | Futamura | 370/332 |
| 6,721,564 | B1 * | 4/2004 | Kobayashi | 455/436 |
| 2003/0014705 | A1 * | 1/2003 | Suzuki et al. | 714/748 |
| 2003/0072278 | A1 * | 4/2003 | Wu et al. | 370/329 |
| 2003/0095532 | A1 * | 5/2003 | Kim et al. | 370/342 |
| 2003/0219037 | A1 * | 11/2003 | Toskala et al. | 370/496 |
| 2004/0235434 | A1 * | 11/2004 | Peltola | 455/101 |
| 2005/0039205 | A1 * | 2/2005 | Riedl | 725/32 |

\* cited by examiner

*Primary Examiner*—Edward F. Urban
*Assistant Examiner*—Charles Chow
(74) *Attorney, Agent, or Firm*—Harrington & Smith, PC

(57) ABSTRACT

Disclosed is a UE and a method to operate the UE in the Site Selection Diversity Transmit mode. The method includes detecting a case where no base station is transmitting to the UE; inserting predetermined values into a received signal; and decoding the predetermined values. The predetermined values preferably correspond to zero bits.

6 Claims, 4 Drawing Sheets

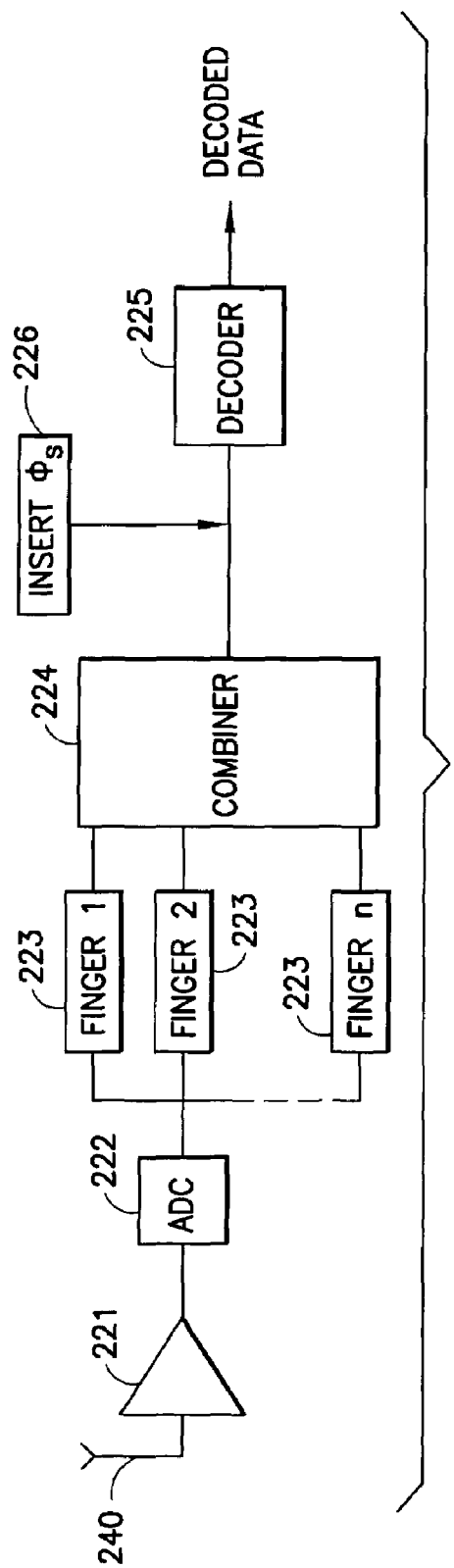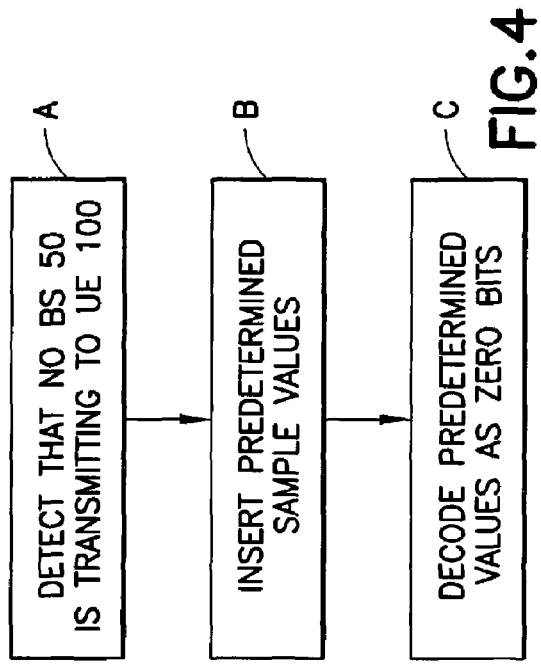

METHOD AND APPARATUS FOR RECEIVING SITE SELECTION DIVERSITY TRANSMIT (SSDT) SIGNAL IN A WIDEBAND CODE DIVISION MULTIPLE ACCESS (WCDMA) SYSTEM

CLAIM OF PRIORITY FROM COPENDING PROVISIONAL PATENT APPLICATION

This patent application claims priority under 35 U.S.C. §119(e) from Provisional Patent Application No. 60/468,471, filed May 6, 2003, the disclosure of which is incorporated by reference herein in its entirety.

TECHNICAL FIELD

This invention relates generally to cellular telephone systems, terminals and user equipment (UE) and, more specifically, relates to handover and soft handover techniques in a CDMA-based system.

BACKGROUND

There is currently specified a procedure known as SSDT (Site Selection Diversity Transmit power control) for use in a receiver of a WCDMA (Wideband Code Division Multiple Access) based system. The SSDT is a macro diversity method used in the soft handover mode, where the UE selects one of the cells from its active set of cells to be the primary cell. All other cells in the active set are then classified as being non-primary cells. The main objective is to transmit on the downlink (base station (BS) to UE) only from the primary cell, thus reducing the interference caused by multiple transmissions from other BSs in the soft handover mode. During conventional soft handover the UE can be simultaneously receiving transmissions from more than one BS.

In order to select a primary cell, each cell is assigned a temporary identification (ID), and the UE periodically notifies connecting cells of the primary cell's ID. The non-primary cells selected by the UE switch off their transmission power.

In the SSDT technique, as described above, the UE signals a desired Node B's Cell ID on the uplink using the DPCCH (Dedicated Physical Control Channel). In practical deployment scenarios, however, there exists some non-zero probability for the occurrence of an error in the FBI (Feedback Information) bits that are used to transmit the Cell ID. Because of this non-zero error probability it can occur that the Node B signaled as the primary cell by the UE detects the code word erroneously, and thus does not assume the role of the primary cell for the signaling UE. In this a case the Node B does not transmit the downlink DPCH (Dedicated Physical Channel), as it interprets itself as being a secondary cell. As there is no downlink signalling to inform the UE as to which cell(s) have interpreted their role as being either the primary or the secondary cell, a UE functioning according to the current specification will attempt to receive the DPCH from the cell that the UE assumes to be the primary cell. However, a resulting attempt to decode non-existent bits (noise) on the downlink DPCH leads to an undesirable degradation in decoder performance.

SUMMARY OF THE PREFERRED EMBODIMENTS

The foregoing and other problems are overcome, and other advantages are realized, in accordance with the presently preferred embodiments of these teachings.

Disclosed is a UE and a method to operate the UE in the Site Selection Diversity Transmit mode. The method includes detecting a case where no base station is transmitting to the UE; inserting predetermined values into a received signal; and decoding the predetermined values. The predetermined values preferably correspond to zero bits.

In accordance with the method to operate the UE in the Site Selection Diversity Transmit mode the UE selects a primary cell and transmits an identification of the primary cell (Cell ID) using Feedback Information (FI) bits on a Dedicated Physical Control Channel (DPCCH). In response to detecting a case where the selected primary cell fails to transmit a downlink Dedicated Physical Channel (DPCH) to the UE, the UE inserts predetermined sample values into the output of a UE receiver prior to a UE channel decoder and decodes the predetermined sample values as zero bits so as to maintain proper channel decoder operation.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 is a simplified block diagram of the receiver of the UE shown in FIG. 1;

FIG. 4 is a logic flow diagram that illustrates a method in accordance with this invention.

DETAILED DESCRIPTION OF THE PREFERRED EMBODIMENTS

Figure 1:
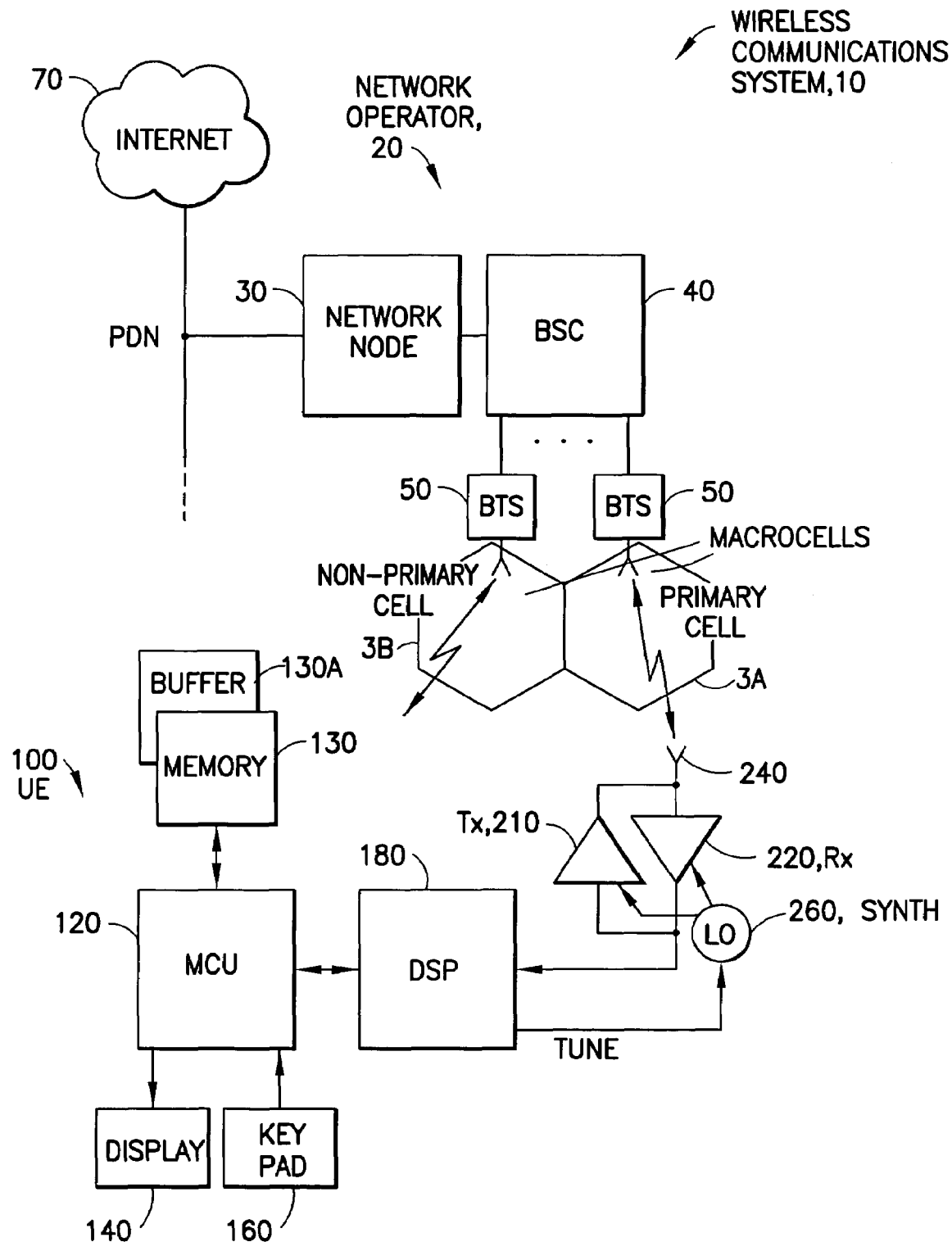
FIG. 1 is a simplified block diagram an embodiment of a wireless communications system that includes a UE that is suitable for practicing this invention.

By way of introduction, and referring to FIG. 1, there is shown as a simplified block diagram an embodiment of a wireless communications system 10 that is suitable for practicing this invention. The wireless communications system 10 includes at least one mobile station or UE 100. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the UE 100 in accordance with a predetermined air interface standard. A reverse or uplink communication path also exists from the UE 100 to the network operator, which conveys mobile originated access requests and traffic. A cell 3 is associated with each BTS 50, where one cell will at any given time be considered to be a serving cell, while an adjacent cell(s) will be considered to be a neighbor cell. In this invention the UE 100 will determine one of the cells 3A to be the primary cell, and the other cell(s) 3B to be non-primary cells, as was discussed above.

The air interface standard can conform to any suitable standard or protocol, and may enable both voice and data traffic, such as data traffic enabling Internet 70 access and web page downloads. In the presently preferred embodiment of this invention the air interface standard is compatible with a WCDMA air interface standard, although this is not a limitation upon the practice of this invention.

The UE 100 typically includes a control unit or control logic, such as a microcontrol unit (MCU) 120 having an output coupled to an input of a display 140 and an input coupled to an output of a keyboard or keypad 160. The UE 100 may be a handheld radiotelephone, such as a cellular telephone or a personal communicator. The UE 100 could also be contained within a card or module that is connected during use to another device. For example, the UE 10 could be contained within a PCMCIA or similar type of card or module that is installed during use within a portable data processor, such as a laptop or notebook computer, or even a computer that is wearable by the user.

The MCU 120 is assumed to include or to be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer 130A. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

The UE 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

In order to overcome the performance degradation discussed above, the UE 100 first attempts to detect the presence of (or the lack of) the downlink DPCH from the intended primary cell 3A. If the UE 100 detects that there is no DPCH transmitted for it from the primary cell 3A, and referring to FIG. 2, the UE 100 operates to reduce the degradation of the TTI (Transmission Timing Interval) by inserting sample values that correspond to (soft) zeroes into positions corresponding to the bits of the missing DPCH radio frame. The effect at the UE receiver 220 is seen as increased puncturing. By functioning in this manner the UE 100 decoder 225 performance is improved, as the zero soft bit values (neutral values) do not have a detrimental impact on the operation of the decoder 225, and a significant performance gain can be achieved.

FIG. 2 shows an embodiment of the receiver 220 that includes a receiver amplifier 221, an analog-to-digital converter (ADC) 222, a plurality of correlators or fingers 223 (Finger_1, Finger_2, . . . , Finger_n), a combiner 224 and the decoder 225. In accordance with this invention, the receiver 220 also includes an Insert Zeros function or block 226 to insert sample values corresponding, preferably, to zero bits into the received signal prior to the decoder 225.

As is specified in 3GPP TS 25.214/5.2.1.4.1.1, each cell is given a temporary ID during SSDT, and the ID is used as a site selection signal. The ID is expressed as a binary bit sequence. There are three different lengths of coded ID available to the UE 100, denoted as "long", "medium" and "short". The wireless network 20 determines which length of coded ID is used.

In practice, this means that if the "long" ID code is used, and only one FBI bit is in the slot, then the reporting rate is once per frame. Correspondingly, if the "short" ID code is in use, and there are two FBI bits in the slot, there are five reports per frame.

Figure 3A:
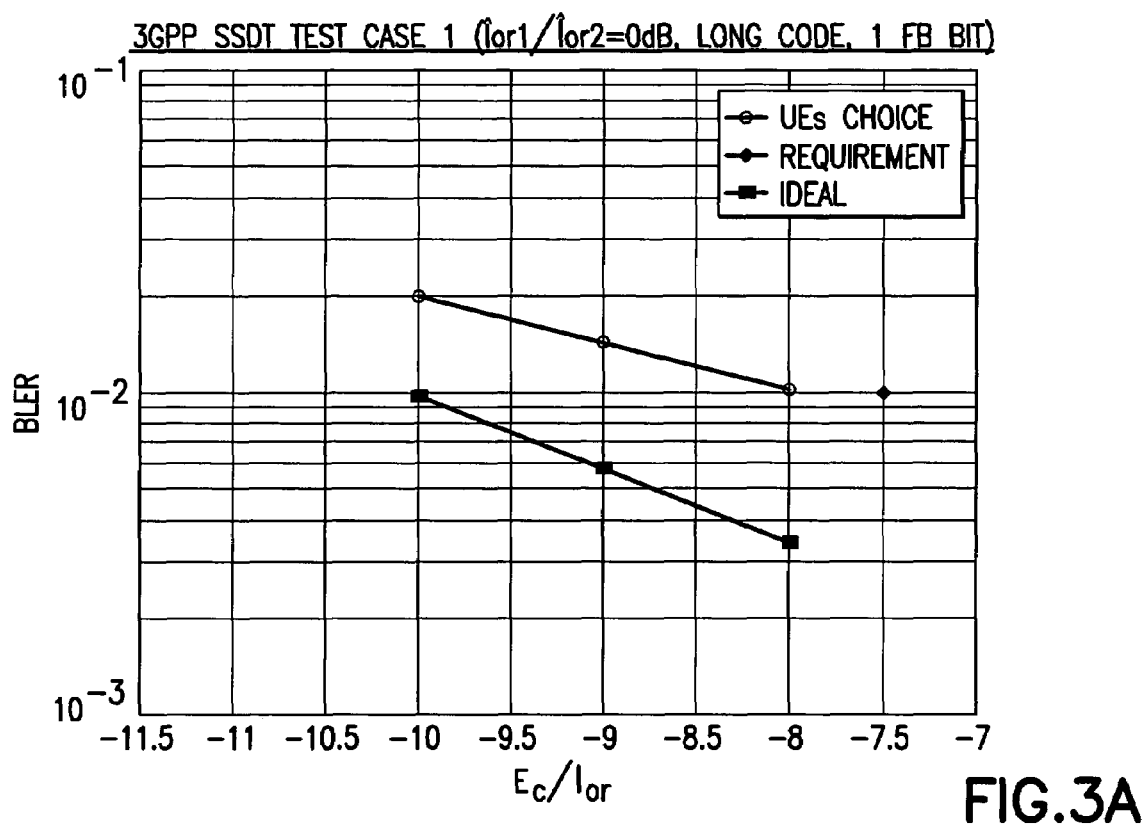
FIGS. 3A–3D are graphs that plot block error rate (BLER) versus $E_c/I_{or}$ for various test cases.
Figure 3B:
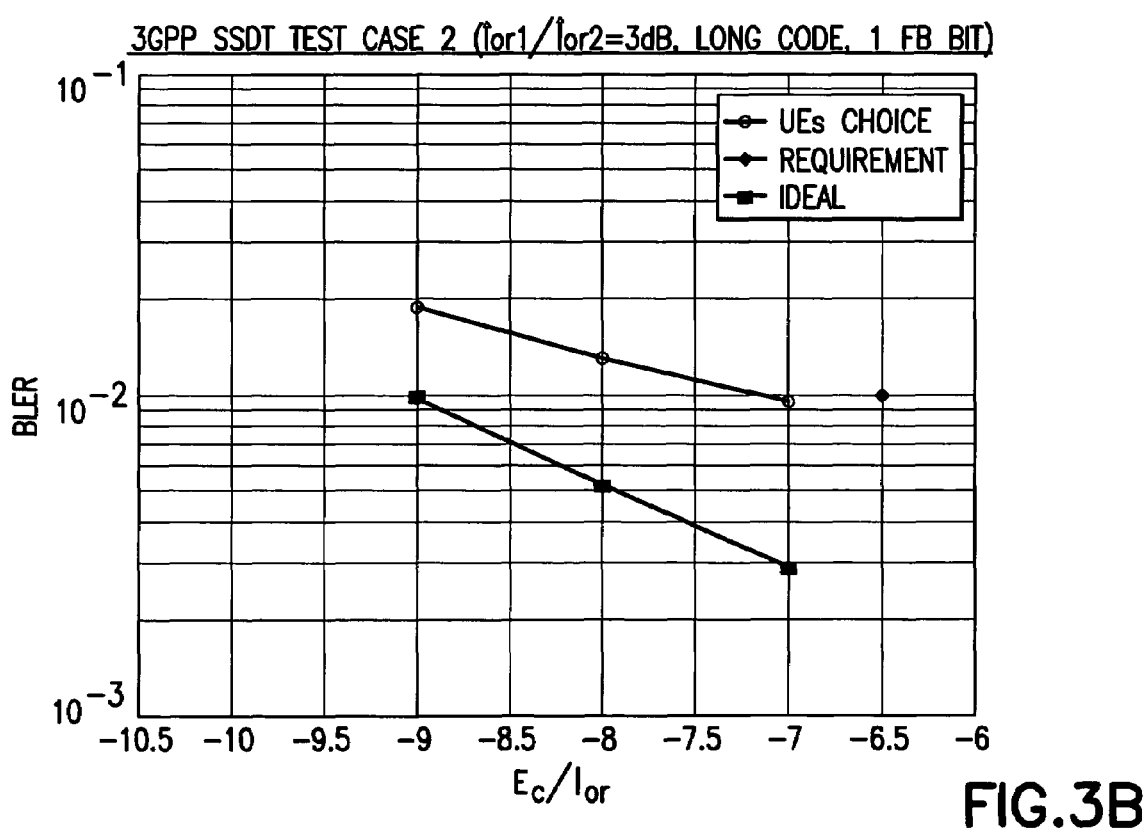
Figure 3C:
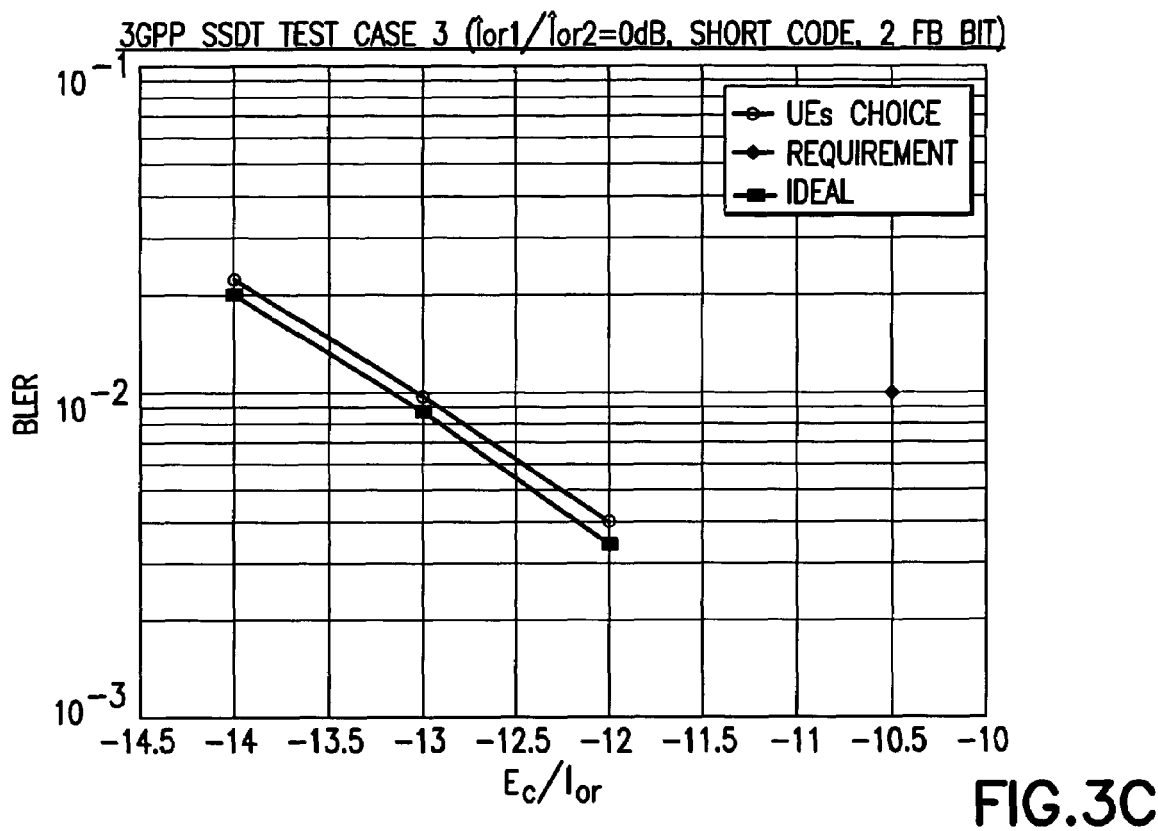
Figure 3D:
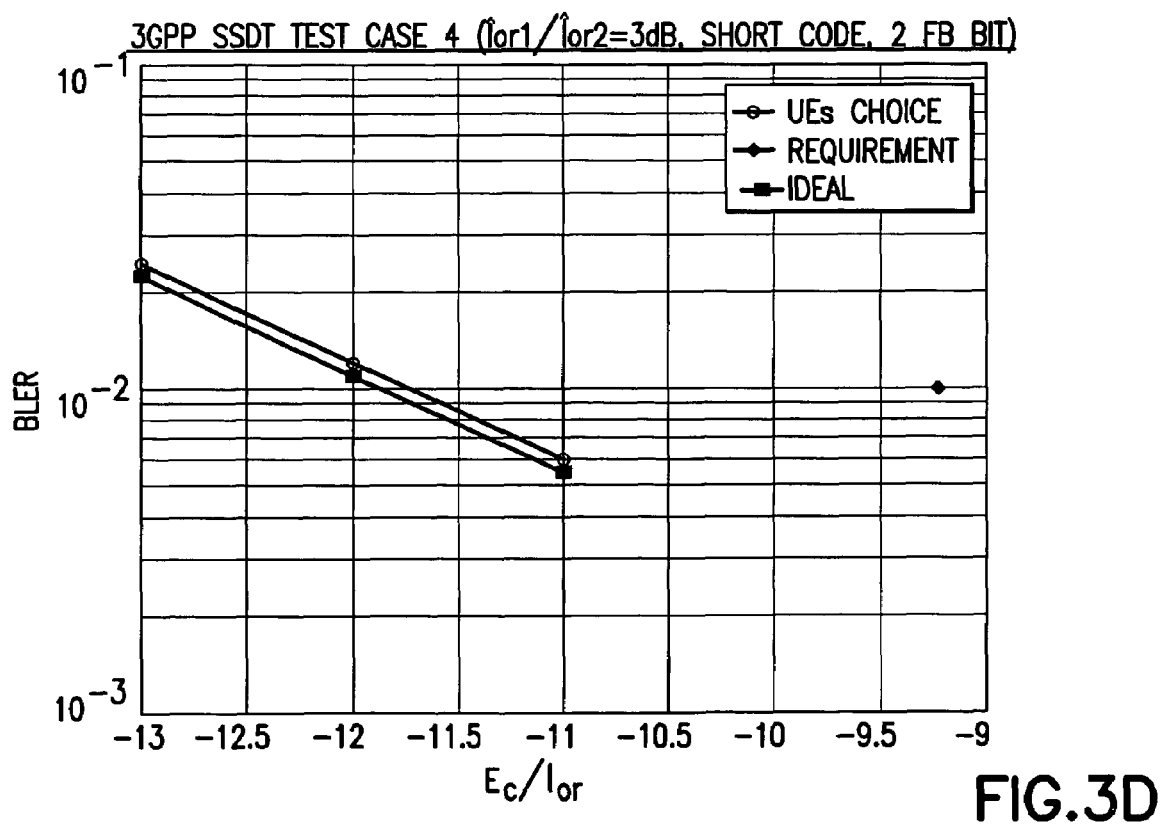

Reference is made to the graphs of FIGS. 3A, 3B (long ID code case) and 3C, 3D (short ID code case). In an ideal case, if the UL error occurs (e.g., with a 1% probability), then there is about 99% probability that no BSs 50 are transmitting, and there is about a 1% probability that a non-desired BS 50 will be transmitting. As a finger 223 is always allocated to the BS 50 that transmits, the UE 100 knows if an UL error has occurred. If none of the BSs 50 are transmitting then the output of the combiner 224 is zero.

In another case, that of uncorrelated UL errors, the error occurrences are as above but the fingers 223 are allocated based on the reported Cell ID, i.e., the UE 100 does not know if the UL error has occurred. In other words, the UE 100 allocates a finger 223 to the BS 50 that it expects to be transmitting the DPCH, but no signal is received (case (3) below). It is for this case that the Insert Zeroes block 226 is operated. The UE 100 can detect that the expected primary BS 50 is not transmitting by, for example, determining that too little energy is present in the finger 223 assigned to the primary BS 50, that is, if the assigned finger 223 contains less energy than would be expected if it were actually demodulating the DPCH.

The probabilities for the case of the uncorrelated code word errors ($P\_e$) of most interest to this invention are as follows:

1) P(BS1 on and BS2 off, where BS1 is the primary)= $(1-P\_e)*(1-P\_e)=0.9801$, i.e., the probability that BS1 is transmitting and BS2 is not transmitting, given that BS1 should be transmitting, 2) P(BS1 on and BS2 on, where BS1 is the primary)=$(1-P\_e)*P\_e=0.0099$, 3) P(BS1 off and BS2 off, where BS1 is the primary) =$P\_e*(1-P\_e)=0.0099$, and 4) P(BS1 off and BS2 on, where BS1 is the primary) =$P\_e*P\_e=0.0001$.

The same results are obtained when BS2 should be the primary.

The implementation of this invention can be accomplished either in hardware in, for example, an ASIC (Application Specific Integrated Circuit), or in software executed by the DSP 180, or in a combination of hardware and software.

This use of this invention improves the performance of the UE 100 in the SSDT mode of operation as a result of an erroneous uplink DPCCH transmission. The performance gain increases with increased reporting period length (e.g., reporting rates can be 1, 2, 3, 4 or 5 reports per frame), at the expense of slight increase in complexity resulting from the detection of transmission gaps (referred to herein as SSDT verification), i.e., detecting those cases where a cell does not recognize itself as being a primary cell.

Referring to FIG. 4, in a method to operate the UE 100 in the Site Selection Diversity Transmit mode the following steps are executed. At Block A the UE 100 detects a case where no base station is transmitting to the UE; at Block B the UE 100 inserts predetermined values, preferably those corresponding to zero bits, into a received signal; and at Block C the decoder 225 decodes the predetermined values as zero bits.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. However, all such modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method to operate a user equipment (UE) in a Site Selection Diversity Transmit mode of a WCDMA wireless communications system, comprising:
    selecting a primary cell;
    transmitting an identification of the primary cell (Cell ID) using Feedback Information (FI) bits on a Dedicated Physical Control Channel (DPCCH);
    in response to detecting a case where the selected primary cell fails to transmit a downlink Dedicated Physical Channel (DPCH) to the UE, inserting predetermined sample values into the output of a UE receiver prior to a UE channel decoder; and
    decoding the predetermined sample values as zero bits so as to maintain proper channel decoder operation.

2. A user equipment (UE) operable in a Site Selection Diversity Transmit mode of a wireless communications system, comprising:
    a radio frequency transceiver comprising a transmitter and a receiver;
    a decoder having an input coupled to an output of said. receiver; and
    a controller coupled to the transceiver, said controller operating to select a primary cell for the UE and to transmit, via said transmitter, an identification of the primary cell (Cell ID) using Feedback Information (FL) bits on a Dedicated Physical Control Channel (DPC-CFI); said controller being responsive to the selected primary cell failing to transmit a downlink Dedicated Physical Channel (DPCH) to the UB to insert predetermined sample values into said input of said channel decoder such that said decoder decodes the predetermined sample values as zero bits.

3. A UE as in claim 2, where said wireless communications system comprises a code division multiple access system, where said receiver comprises at least one finger for demodulating a received signal, and where said controller detects that the selected primary cell has failed to transmit the downlink DPCH to the UE by assigning the at least one finger to demodulate the DPCH, and determining that too little energy is present in the at least one finger that is assigned to demodulate the DPCH.

4. A computer program product embodied on a computer readable medium execution of which operates user equipment (UE) in a Site Selection Diversity Transmit mode of a WCDMA wireless communications system, comprising operations of:
    selecting a primary cell;
    transmitting an identification of the primary cell (Cell ID) using Feedback Information (FI) bits on a Dedicated Physical Control Channel (DPCCH);
    in response to detecting a case where the selected primary cell fails to transmit a downlink Dedicated Physical Channel (DPCH) to the UE, inserting predetermined sample values into the output of a UB receiver prior to a UE channel decoder; and
    decoding the predetermined sample values as zero bits so as to maintain proper channel decoder operation.

5. A radio frequency receiver operable in a Site Selection Diversity Transmit mode of a wireless communications system, comprising:
    a decoder having an input coupled to an output of said receiver; and
    a controller coupled to said receiver, said controller responsive to a cell failing to transmit a downlink Dedicated Physical Channel (DPCH) to insert predetermined sample values into said input of said decoder such that said decoder decodes the predetermined sample values as zero bits.

6. A radio frequency receiver as in claim 5, where said wireless communications system comprises a code division multiple access system, where said receiver comprises at least one finger for demodulating a received signal, and where said controller detects that the cell has failed to transmit the downlink DPCH by assigning the at least one finger to demodulate the DPCH, and determining that the cell has failed to transmit the downlink DPCH from an amount of energy present in the at least one finger.

* * * * *

UNITED STATES PATENT AND TRADEMARK OFFICE
CERTIFICATE OF CORRECTION

| | | |
|---|---|---|
| PATENT NO. | : 7,206,577 B2 | Page 1 of 1 |
| APPLICATION NO. | : 10/805994 | |
| DATED | : April 17, 2007 | |
| INVENTOR(S) | : Peltola | |

It is certified that error appears in the above-identified patent and that said Letters Patent is hereby corrected as shown below:

In Claim 2: Column 5, line 51, delete "CFI" and replace with --CH--.

In Claim 2: Column 6, line 1, delete "UB" and replace with --UE--.

In Claim 4: Column 6, line 26, delete "UB" and replace with --UE--.

Signed and Sealed this

Twenty-sixth Day of June, 2007

JON W. DUDAS
*Director of the United States Patent and Trademark Office*